(12) United States Patent
Havskog

(10) Patent No.: US 6,851,901 B2
(45) Date of Patent: Feb. 8, 2005

(54) TOOL, A MACHINE TOOL, AND A METHOD OF CUTTING

(75) Inventor: Nils-Erik Havskog, Linköping (SE)

(73) Assignee: Saab AB, Linkoping (SE)

( * ) Notice: Subject to any disclaimer, the term of this patent is extended or adjusted under 35 U.S.C. 154(b) by 119 days.

(21) Appl. No.: 10/169,144

(22) PCT Filed: Dec. 22, 2000

(86) PCT No.: PCT/SE00/02657
§ 371 (c)(1),
(2), (4) Date: Sep. 5, 2002

(87) PCT Pub. No.: WO01/49442
PCT Pub. Date: Jul. 12, 2001

(65) Prior Publication Data
US 2003/0047046 A1 Mar. 13, 2003

(30) Foreign Application Priority Data
Dec. 27, 1999 (SE) .............................................. 9904792

(51) Int. Cl.$^7$ .............................. B23C 1/00; B23C 5/02; B23C 5/04; B23C 5/10
(52) U.S. Cl. ....................... 409/132; 409/200; 409/143; 409/136; 407/54
(58) Field of Search ................... 409/66, 74, 131–132, 409/143, 200, 191, 136; 451/51, 61, 211, 357; 407/53–54, 34, 42, 40, 47, 64

(56) References Cited

U.S. PATENT DOCUMENTS

| | | | | |
|---|---|---|---|---|
| 4,437,526 A | * | 3/1984 | Gloor | 409/143 |
| 4,589,174 A | | 5/1986 | Allen | |
| 4,693,641 A | * | 9/1987 | Tsujimura et al. | 407/42 |
| 4,693,646 A | * | 9/1987 | Andrews | 409/136 |
| 5,316,419 A | * | 5/1994 | Bohnet et al. | 409/143 |
| 5,676,506 A | * | 10/1997 | Sugata | 409/136 |
| 5,733,078 A | * | 3/1998 | Matsushita et al. | 409/74 |
| 5,762,594 A | | 6/1998 | Hoppe | |
| 6,007,281 A | * | 12/1999 | Eriksson et al. | 409/132 |
| 6,488,454 B1 | * | 12/2002 | Ahn et al. | 409/132 |
| 2002/0018699 A1 | * | 2/2002 | Shimomura et al. | 407/34 |

FOREIGN PATENT DOCUMENTS

| | | | |
|---|---|---|---|
| DE | 3924696 A1 | * | 2/1991 |
| DE | 004228322 A1 | * | 3/1994 |
| EP | 307823 A2 | * | 3/1989 |
| EP | 0934788 | | 8/1999 |
| EP | 1077100 | | 2/2001 |
| GB | 1479540 | | 7/1977 |
| WO | WO98/09758 A1 | * | 3/1998 |
| WO | 98/09762 | | 3/1998 |
| WO | 00/12249 | | 3/2000 |

* cited by examiner

Primary Examiner—Erica Cadugan
(74) Attorney, Agent, or Firm—Swidler Berlin Shereff Friedman, LLP

(57) ABSTRACT

The invention refers to a tool (1), a machine tool, and a method for cutting machining of a workpiece. The tool includes a mounting portion (5) for mounting of the tool in the machine tool, a tool shaft (7), which has a first inner end (7'), connected to the mounting portion (5), a longitudinal center axis (a), which extends through the mounting portion and the tool shaft, and a main cutting edge (9) on the tool shaft. The main cutting edge (9) has an extension in an axial direction along an imaginary envelope surface, which is concentric to the center axis (a) and located radially outside an outer periphery surface of the tool shaft (7). The main cutting edge (9) is arranged to permit cutting engagement with said workpiece when the tool is rotated around the longitudinal center axis.

6 Claims, 2 Drawing Sheets

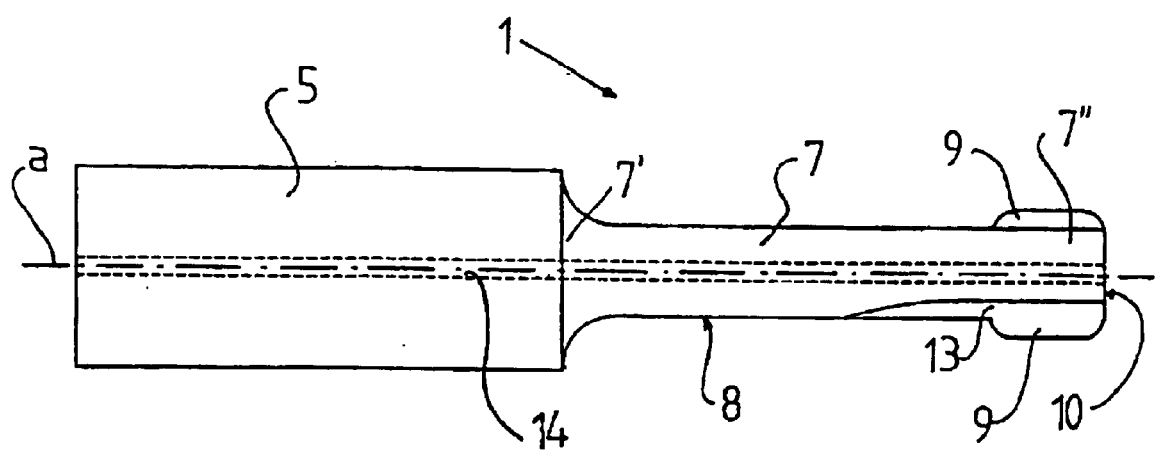
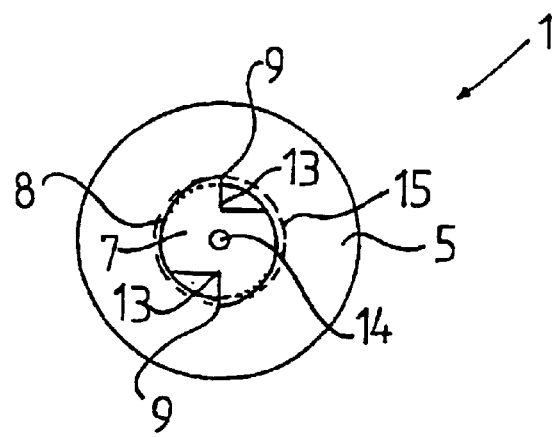

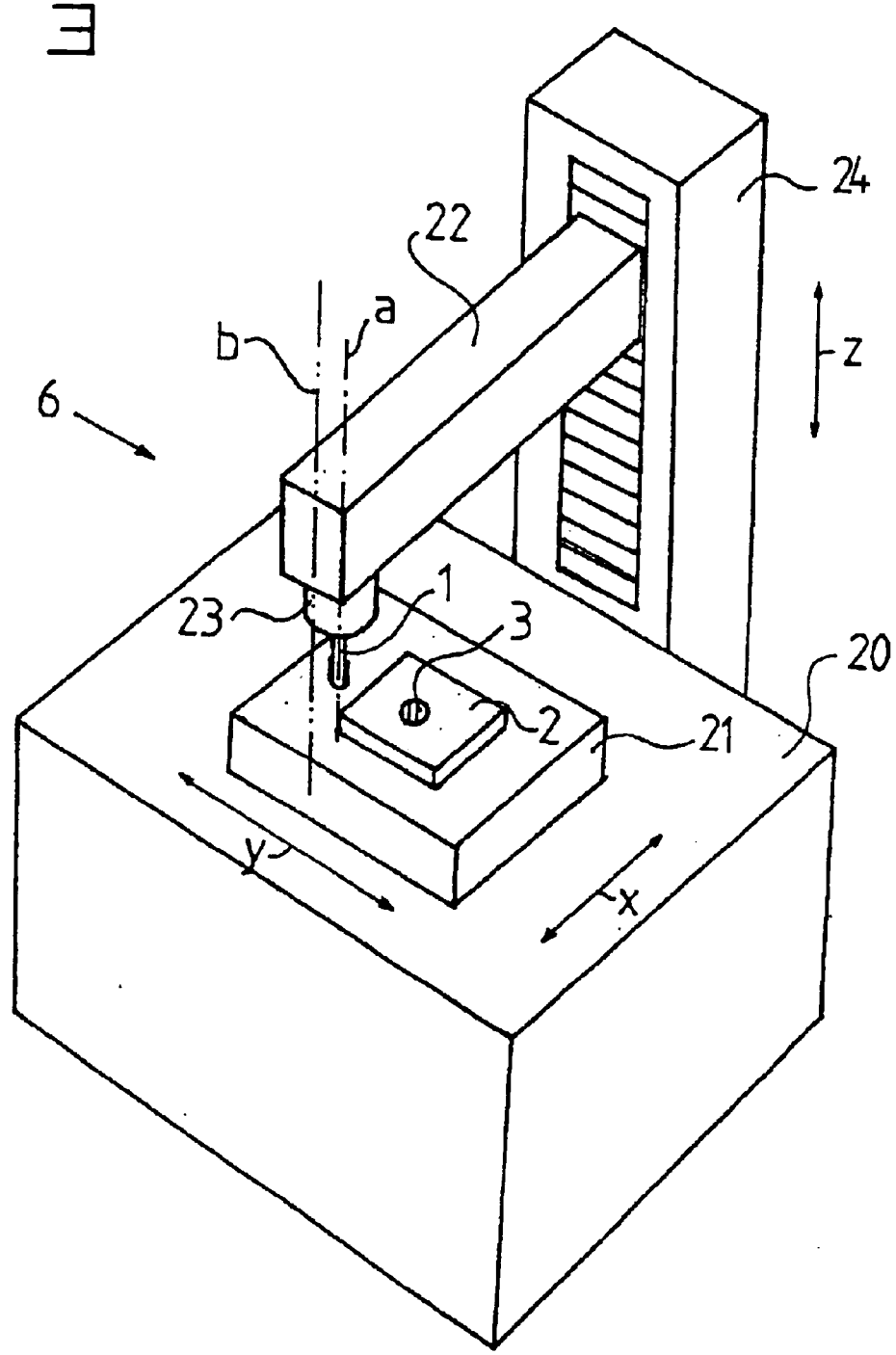

US 6,851,901 B2

TOOL, A MACHINE TOOL, AND A METHOD OF CUTTING

THE BACKGROUND OF THE INVENTION AND PRIOR ART

The present invention refers to a tool for cutting machining of a workpiece, comprising a mounting portion, which is arranged to permit mounting of the tool in a machine tool, a tool shaft, which has a first inner end, connected to the mounting portion, and a second outer end, a longitudinal centre axis, which extends through the mounting portion and the tool shaft, and at least one main cutting edge, which is provided on the tool shaft. The invention also refers to a machine tool for cutting machining of a workpiece, including a tool, which comprises

- a mounting portion by which the tool is mounted in the machine tool,
- a tool shaft, which has a first inner end, connected to the mounting portion, and a second outer end,
- a longitudinal centre axis, which extends through the mounting portion and the tool shaft, and
- at least one main cutting edge, which is provided on the tool shaft, first means arranged to rotate the tool with a first rotational movement around the centre axis, second means arranged to rotate the tool shaft or the workpiece in such a way that the tool performs a second rotating movement around a second axis, which is parallel to and located at a distance from the centre axis, and third means arranged to rotate the tool or the workpiece in relation to each other in such a way that the tool performs a third feeding movement in the direction of the centre axis. Furthermore, the invention refers to a method for machining of a workpiece by using such a tool.

It is known to machine holes in workpieces by different types of finishing tools, such as reamers, boring bars and grinding tools. However, the machining by such tools is very time-consuming, in particular if a high accuracy is aimed at. In addition, in many cases a large set of tools with different dimensions is required in order to permit finishing of holes of different sizes, since each hole dimension requires an individual tool.

SUMMARY OF THE INVENTION

The object of the present invention is to enable finishing machining with a high accuracy. A more specific object is to enable finishing machining of the surface, which defines a hole of a workpiece. A further object is to enable finishing machining by one single tool for holes of different diameters.

This object is obtained by the tool initially defined, which is characterised in that said main cutting edge has an extension in the direction of the centre axis along an imaginary envelope surface, which is concentric with the centre axis and located radially outside an outer periphery surface of the tool shaft, wherein said main cutting edge is arranged to permit cutting engagement with said workpiece when the tool is rotated around the longitudinal centre axis.

By means of a tool having such a lateral main cutting edge, a workpiece surface, which is substantially parallel to the longitudinal centre axis, may be machined by the milling operation defined in such a way that a high surface fineness is obtained. Furthermore, the tool creates possibilities to perform the machining in a relatively short time, for instance in a so-called HSM-machine (High Speed machining). In addition, the same tool may be used for a large number of different machining situations, for instance for machining of holes having different hole diameters.

According to an advantageous embodiment of the invention, said main cutting edge in the direction of a centre axis has an extension which is relatively short in relation to the axial length of the tool shaft. By such a short main cutting edge, the tool is relatively simple and may thus be manufactured to a low cost. Thereby, the main cutting edge a main the direction of the centre axis have an extension, which is relatively short in an axial direction in relation to the length of the workpiece, which the tool is intended to machine. A complete machining of the workpiece surface may be obtained by feeding the tool in the direction of the longitudinal centre axis.

According to a further embodiment of the invention, said main cutting edge is provided in the proximity of the second outer end of the tool shaft. Thereby, it is possible to machine for instance substantially the whole cylindrical limiting surface of a hole having a bottom. The tool shaft may include an end surface at the second outer end. This end surface may be substantially plane or concave.

According to a further embodiment of the invention, the tool includes at least one chip channel, which extends substantially in parallel to said main cutting edge. By such a chip channel removal of the chips, formed during the machining, is possible. The chip channel may advantageously extend through the end surface and substantially immediately adjacent to said cutting edge. Furthermore, the chip channel may extend from the second outer end passing the main cutting edge.

According to a further advantageous embodiment of the invention, the imaginary envelope surface is cylindrical along a substantial part of its axial length.

According to a further embodiment of the invention, said main cutting edge is rounded at its axial outer end. Thereby, a high strength of the tool is obtained in the same way, said main cutting edge may also be rounded at its axial inner end.

According to a further advantageous embodiment of the invention, the tool includes a coolant channel for the supply of a coolant, wherein the coolant channel extends through the tool shaft substantially concentrically with the centre axis. By such a coolant channel, a long life of the tool may be obtained and furthermore an efficient removal of chips is ensured in all different types of machining. The coolant channel may extend through the end surface.

According to a further embodiment of the invention, said cutting edge extends at an angle which is between $-25°$ and $+25°$ in relation to the centre axis, preferably $-15°$ and $+15°$ in relation to the centre axis. In particular, said cutting edge may extend substantially in parallel to the centre axis.

According to a further embodiment of the invention, the tool is intended for cutting machining by milling of a hole or a recess of the workpiece, preferably circular cylindrical holes. In particular, the tool is intended for finishing cutting. Thereby, the tool, except for said rotational movement around the centre axis, may also be intended to perform a second rotating movement in relation to the workpiece around a second axis, which is parallel to and located at a distance from the centre axis, and furthermore be intended to perform a third feeding movement in relation to the workpiece in the direction of the centre axis.

The object is also obtained by the machine tool initially defined, which is characterised in that said main cutting edge has an extension in the direction of the centre axis along an imaginary envelope surface, which is concentric with the centre axis and located radially outside an outer periphery surface of the tool shaft, wherein said main cutting edge is arranged to permit cutting engagement with said workpiece when the tool is rotated around the longitudinal centre axis. Advantageously said first means may be arranged to rotate the tool at a speed above 10,000 rounds per minute.

The object is also obtained by the initially defined method, which includes the steps of:

providing a tool which comprises
- a mounting portion, which is arranged to permit mounting of the tool in a tool machine tool,
- a tool shaft, which has a first inner end, connected to the mounting portion, and a second outer end,
- a longitudinal centre axis, which extends through the mounting portion and the tool shaft, and
- at least one main cutting edge, which is provided on the tool shaft, wherein said main cutting edge has an extension in an axial direction along an imaginary envelope surface, which is concentric with the centre axis and located radially outside an outer periphery surface of the tool shaft, rotating the tool at a first rotational movement around the centre axis, feeding the tool in relation to the workpiece by a second rotating movement around a second axis, which is parallel to and located at a distance from the centre axis in such a way that said main cutting edge is in cutting engagement with the workpiece, feeding the tool in relation to the workpiece by a third feeding movement in the direction of the centre axis during feeding of the tool by the second rotating movement and said main cutting edge being in cutting engagement with the workpiece.

According to an advantageous application of the method, it is referred to cutting machining of a cylindrical hole of the workpiece. Thereby, the tool may in a first step, be rotated by the second rotating movement around an end of the hole without the third feeding movement, in a second step, the rotated by the second movement and at the same time fed by the third movement along the hole and, in a third step, be rotated by the second rotating movement around an end of the hole without the without the third feeding movement.

BRIEF DESCRIPTION OF THE DRAWINGS

The present invention is now to be explained more closely by a description of different embodiments and with reference to the drawings attached.

FIG. 1 discloses schematically a side view of a tool according to the invention.

FIG. 2 discloses schematically a view from below of the tool in FIG. 1.

FIG. 3 discloses schematically a perspective view of a machine tool according to the invention.

DETAILED DESCRIPTION OF VARIOUS EMBODIMENTS OF THE INVENTION

FIGS. 1 and 2 disclose a tool 1 for cutting machining of a workpiece 2, see FIG. 3. The tool 1 is in particularly intended for finishing machining of the cylindrical limiting wall of a hole 3 in the workpiece 2. Such holes 3 may have different cross-sectional shapes and for instance be cylindrical or oval. The tool 1 according to the invention may also be used for machining a concave limiting wall of a recess, which extends inwardly from a side surface of a workpiece 2.

The tool 1 includes a mounting portion 5, which is arranged to permit mounting of the tool 1 in a machine tool 6, see FIG. 3. The mounting portion 5 is substantially circular cylindrical. Furthermore, the tool 1 includes a tool shaft 7, which has a first inner end 7' and a second outer end 7". The tool shaft 7 is at its first inner end 7' connected to the mounting portion 5. The tool shaft 7" also has a substantially circular cylindrical shape, i.e. the tool shaft 7 has a substantially circular cylindrical periphery surface 8. The mounting portion 5 and the tool shaft 7 have a common, longitudinal centre axis a, which thus extends concentrically through the mounting portion 5 and the tool shaft 7.

Furthermore, the tool 1 includes at least one lateral main cutting edge 9, which is provided on the tool shaft 7. In the example disclosed the tool 1 includes two such lateral main cutting edges 9. However, it is to be noted that the tool 1 also may be realised by one such main cutting edge 9 or by more than two main cutting edges 9, for instance three or four such main cutting edges 9.

The main cutting edges 9 have in the direction of centre axis and a extension, which is relatively short in relation to the extension of the tool shaft 7 in the direction of the centre axis a. Furthermore, the main cutting edges 9 may in the direction of the centre axis a, have an extension, which is relatively short in relation to the axial length of the hole 3 or the recess, which the tool 1 is intended to machine.

As appears from FIG. 1, the main cutting edges 9 are provided in the proximity of the second outer end 7" of the tool shaft 7, and more exactly, the main cutting edges 9 extend substantially to the end surface 10 at the second outer end 7". The end surface 10 may be substantially plane or concave. In certain applications, the end surface 10 may also be convex. Furthermore, the main cutting edges 9 are rounded at their axial outer ends and their axial inner ends. Each main cutting edge 9 thus includes a curved shape and in particular a radius at its ends.

The tool 1 disclosed also includes two chip channels 13, which extend substantially in parallel to a respective main cutting edge 9 and substantially in parallel to the centre axis a. As appears from FIG. 2, each chip channel 13 extends substantially immediately adjacent to a respective main cutting edge 9. The chip channels 13 extends through the end surface 10 and in a direction towards the mounting portion 5 passing the two main cutting edges 9.

Advantageously, the tool 1 may also include a coolant channel 14 for the supply of a coolant. The coolant channel 14 extends in the example disclosed through the whole tool 1, i.e. through the mounting portion 5, the tool shaft 7 and the end surface 10. In the example disclosed, the coolant channel 14 is substantially concentric with the centre axis a.

The tool 1 is intended to be rotated around the centre axis a in, for instance, the machine tool 6 disclosed. When the tool 1 is rotated around the centre axis a, the main cutting edges form en imaginary envelope surface 15, which is concentric with the centre axis a and located radially outside the periphery surface of the tool shaft 7. The imaginary envelope surface is preferably cylindrical along a substantial part of its length in the direction of the centre axis a. Thanks to the fact that the main cutting edges 9 are located radially outside the periphery surface a of the tool shaft 7, a cutting engagement of the main cutting edges 9 in the workpiece 2 is possible.

In the example disclosed, the main cutting edges 9 extend substantially in parallel to the centre axis a. However, it is to be noted that the main cutting edges 9 may have pitch or be inclined in relation to the centre axis a. For instance, the main cutting edges 9 may form an angle to the centre axis a. This angle may between −250 and +250, preferably between −150 and +150.

By means of the machine tool 6 schematically disclosed in FIG. 3, holes 3 or the like may be machined in the workpiece 2. The machine tool 6, which for instance may be a so-called HSM-machine, includes a machine bed 20 on which a workpiece holder 21 is provided in a displaceable manner. The workpiece holder 21 may thereby be displaceable in the x-direction as well as the y-direction and in such a way that the workpiece holder 21 and the workpiece 2 describes a rotating movement, for instance around a vertical axis b. Furthermore, the machine tool 6 includes a tool holder 22 with a rotatable spindle device 23, which is arranged to receive the tool 1 and to rotate the tool 1 around the centre axis a of the tool 1. The spindle device 23 is arranged to rotate the tool 1 at a very high speed, see below. As appears from FIG. 3, the vertical centre axis a is located at a distance from the vertical axis b. The tool holder 22 is provided on a support 24 in a displaceable manner in a substantially vertical direction z.

By means of such a HSM-machine, it is possible to machine the workpiece 2 at a so-called high speed machining. High speed machining is characterised in that the tool 1 has a very high speed in relation to the workpiece 2 in comparison with conventional machining technique. The high cutting speed means that the temperature of the workpiece 2 in an area in the proximity of the cutting edge 9 is very high, wherein a plasma-like state of the workpiece material is formed in this area. High speed machining is also characterised in that the cutting forces, which normally increases with an increasing cutting velocity, decreases with an increasing cutting velocity when the machining converts to so-called high speed machining. As examples of cutting speeds for machining of different materials, the following may be mentioned:

aluminium; about 3,000 m/min (conventionally about 100–400 m/min),
titanium; about 15,000 m/min (conventionally about 15–100 m/min).

By means of the machine tool 6 disclosed, the tool 1 may thus be rotated around its own axis a and furthermore perform a rotating movement in relation to the workpiece 2 around the axis b. It is to be noted that the second rotating movement also may be provided by letting the spindle device 23 be rotatably provided in the machine tool 6 as an alternative to the rotatable or displaceable workpiece holder 21. Furthermore, the tool 1 may be displaced in the vertical direction z and in such a way be fed into and out of the workpiece 2.

The machining of a hole 3 of a workpiece 2 may be performed according to the following. The workpiece 1 is rotated around the centre axis a by means of the spindle device 23. Thereafter, the tool 1 is fed in the direction z towards the workpiece so that the cutting edges 9 are located at the level of the upper end of the hole 3 of the workpiece 2. Then the tool 1 is rotated around the second axis b, either by rotating the workpiece holder 21 or the spindle device 23. In such a way, the cutting edges 9 of the tool 1 are brought into engagement with the cylindrical limiting surface of the hole 3 at an upper end. Thereafter, the tool 1 is rotated around the axis b a complete round, i.e. around the whole upper end of the cylindrical limiting surface of the hole 3.

After this first round, the tool 1 is slowly fed downwardly in the direction z at the same time as the rotation around the axis b continues. In such a way, the cylindrical limiting surface of the hole 3 is machined by a helical movement of the tool 1. When the tool 1 arrives at the lower end of the hole, the feeding in the direction z ceases, and the tool 1 is rotated at least one round around the axis b, i.e. around the whole cylindrical limiting surface of the hole 3 at the lower end. Thereafter, the machining is complete and the tool 1 is returned out of the hole 3 in the direction z.

The tool 1 and the machine tool 6, disclosed as an example, are suitable for machining of holes of different diameters, for instance from holes with a diameter of 5 mm to holes with a diameter of 15 mm. The tool 1, at the imaginary envelope surface 15, may thereby have a diameter which is about 3 mm. For the greater holes, a corresponding tool diameter may be about 6 mm. It is appreciated that the machining operation described above may be performed within about 5–10 seconds.

The invention is not limited to the embodiments described above but may be modified and varied within the scope of the following claims.

In the embodiment disclosed, the tool has been designed in such a way that the mounting portion 5, the tool shaft 7 and the cutting edges 9 form an integrated unit produced in one piece of material. It is to be noted that the cutting edges 9 may be provided on cutting inserts, which are attached to the tool shaft 7 either by a permanent connection or by means of releasable connections.

What is claimed is:

1. A machine tool for cutting machining of a cylindrical hole of a workpiece comprising:

a tool having:
  a mounting portion by which the tool is mounted in the machine tool,
  a tool shaft, which has a first inner end, connected to the mounting portion, and a second outer end,
  a longitudinal center axis, which extends through the mounting portion and the tool shaft, and
  a main cutting edge, which is provided on the tool shaft,
  first means arranged to rotate the tool with a first rotational movement around the center axis;
  second means arranged to rotate the tool shaft in such a way that the tool performs a second rotating movement around a second axis, which is parallel to and located at a distance from the center axis; and
  third means arranged to feed the tool or the workpiece in relation to each other in such a way that the tool performs a third feeding movement in a direction of the center axis;
  wherein said main cutting edge has an extension in the direction of the center axis along an imaginary envelope surface, which is concentric with the center axis and located radially outside an outer periphery surface of the tool shaft and cylindrical along a substantial length thereof, wherein said main cutting edge is rounded at an axially inner end, and wherein said main cutting edge is arranged to permit cutting engagement with said workpiece when the tool is rotated around the longitudinal center axis.

2. A machine tool according to claim 1, wherein said first means is arranged to rotate the tool at a speed above 10,000 rounds per minute.

3. A machine tool according to claim 1, wherein the machine tool is arranged to machine the workpiece by high speed machining.

4. A method for cutting machining of a cylindrical hole of a workpiece, comprising:

providing a tool having:
- a mounting portion, which is arranged to permit mounting of the tool in a tool machine tool,
- a tool shaft, which has a first inner end, connected to the mounting portion, and a second outer end,
- a longitudinal center axis, which extends through the mounting portion and the tool shaft, and
- a main cutting edge, which is provided on the tool shaft, wherein said main cutting edge has an extension in an axial direction along an imaginary envelope surface, which is concentric with the center axis and located radially outside an outer periphery surface of the tool shaft and cylindrical along a substantial length thereof, and said main cutting edge is rounded at its axially inner end;

rotating the tool at a first rotational movement around the eerie center axis;

feeding the tool in relation to the workpiece by a second rotating movement around a second axis, which is parallel to and located at a distance from the center axis in such a way that said main cutting edge is in cutting engagement with the workpiece; and feeding the tool in relation to the workpiece by a third feeding movement in the direction of the center axis during feeding of the tool by the second rotating movement and said main cutting edge being in cutting engagement with the workpiece.

5. A method according to claim 4, wherein the tool in a first step is rotated by the second rotating movement around one end of the hole without the third feeding movement, in a second step is rotated by the second movement and at the same time fed by the third movement along the hole and in a third step is rotated by the second rotating movement around one end of the hole without the third feeding movement.

6. A method according to claim 4, including cutting at a high speed.

* * * * *